March 3, 1931. P. E. BARKER 1,794,822
FLUID PRESSURE ELEVATING MECHANISM FOR VEHICLES
Filed Jan. 3, 1928  2 Sheets-Sheet 1
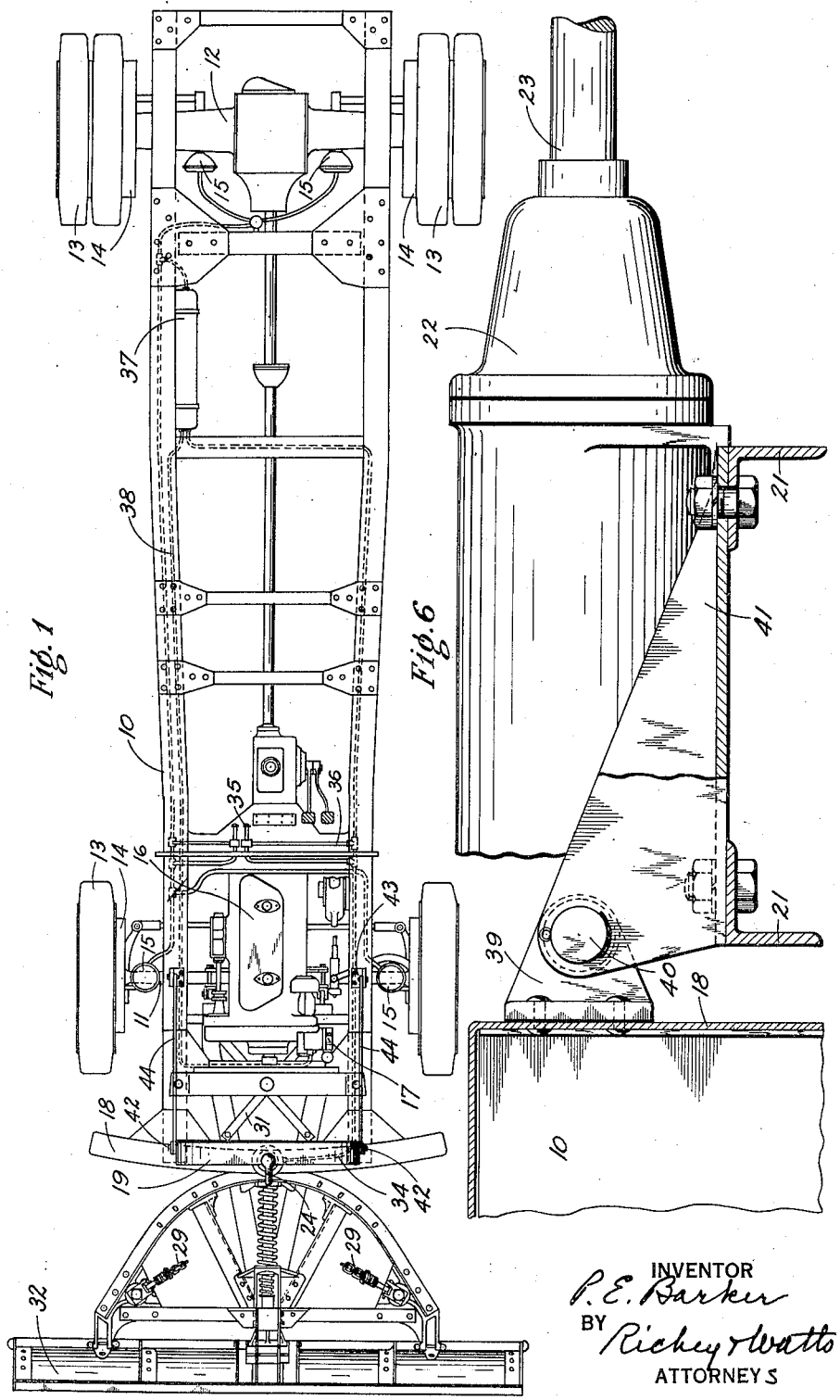
INVENTOR
P. E. Barker
BY Richey & Watts
ATTORNEYS March 3, 1931. P. E. BARKER 1,794,822
FLUID PRESSURE ELEVATING MECHANISM FOR VEHICLES
Filed Jan. 3, 1928 2 Sheets-Sheet 2
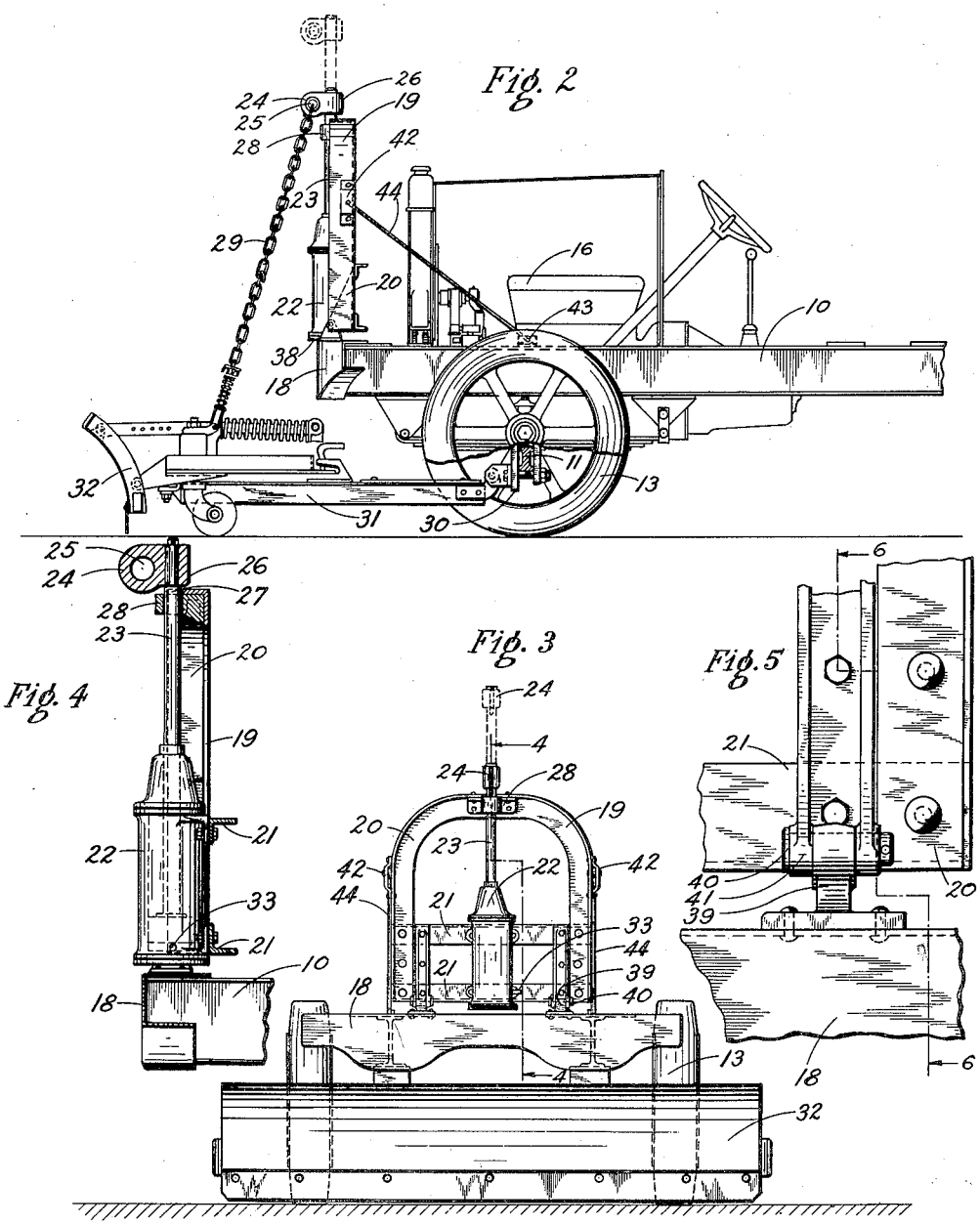
INVENTOR
P. E. Barker
BY
Richey & Watts
ATTORNEYS Patented Mar. 3, 1931

1,794,822

UNITED STATES PATENT OFFICE

PERCY E. BARKER, OF CLEVELAND, OHIO, ASSIGNOR TO THE WHITE MOTOR COMPANY, OF CLEVELAND, OHIO, A CORPORATION OF OHIO

FLUID-PRESSURE ELEVATING MECHANISM FOR VEHICLES

Application filed January 3, 1928. Serial No. 244,146.

This invention relates broadly to motor vehicles and more specifically to a fluid pressure hoisting attachment therefor.

One object of this invention is to construct a fluid pressure hoist and the supporting structure therefor which may be readily attached to a motor vehicle or dismantled therefrom and which may be operatively associated with a vehicular air compressor or coordinated with a vehicle air brake system.

Another object of the invention is to construct a fluid pressure hoisting mechanism adapted for use upon a motor vehicle and cooperatively associated with an air compressor therefor which is capable of elevating relatively heavy bodies such as a snow plow attachment and maintaining the same in suspension while the vehicle is in use.

Other objects and advantages more or less ancillary to the foregoing and the manner in which the various objects are obtained will become apparent from a more complete examination of this specification in the claims of which there are assembled and pointed out certain combinations of parts and specific constructions indicative of the scope and spirit of the invention.

In the drawings which illustrate a preferred embodiment of the invention;

Figure 1 is a top plan view illustrating, somewhat diagrammatically a vehicle chassis equipped with an air compressor, an air brake system and an embodiment of the invention associated with a snow plow attachment affixed to the forward portion of the vehicle chassis;

Figure 2 is a side elevational view illustrating the forward portion of the vehicle chassis shown in Figure 1 and a hoisting mechanism coordinated with the vehicle and snow plow;

Figure 3 is a front elevational view of the hoisting mechanism and a fragmentary portion of the vehicle and snow plow illustrated in Figures 1 and 2;

Figure 4 is a sectional detail view, some of the parts being shown in elevation, taken on a plane indicated by line 4—4 in Figure 3 and illustrating the construction of the elevating mechanism supporting structure;

Figure 5 is a detail elevational view of a fragmentary portion of the cylinder supporting structure;

Figure 6 is a sectional view, shown on an enlarged scale, of the cylinder supporting structure, the view illustrated being taken on a plane indicated by the line 6—6 in Figure 5.

In the practice of this invention, as will be seen by reference to Figure 1 the elevating mechanism is peculiarly adapted for use with a motor vehicle which is equipped with a compressor having a storage tank or reservoir therefor and a valvular controlling mechanism, employed in conjunction with the reservoir, to effect the actuation of the fluid pressure hoist.

The vehicle chassis chosen to illustrate the present embodiment of this invention comprises a chassis frame 10 supported in the conventional manner upon axles 11 and 12 upon which the vehicle road wheels 13 are mounted. The wheels, in the instant case, are provided with brake drums 14 and suitable braking mechanism actuated through air brake cylinders 15.

Upon the forward portion of the chassis there is mounted a motor 16 to which an air compression 17 is connected and driven through suitable gearing, not shown. The forward end of the chassis frame is constructed with a cross member 18 upon which there is mounted a supporting structure 19 which comprises, in the present case, a formed angle iron loop 20 reinforced at its base with strips 21. Secured to these strips there is an air cylinder 22 which is provided with a piston 23 to which a ram 24 is affixed. The ram is provided with an eyelet 25 which in the present case is formed in a casting 26 rigidly connected to a shouldered portion of the ram 24 at the end thereof. The upper portion of the loop member 20 is recessed at 27 to permit the free movement of the ram 24 and adjacent this recess there is an apertured block 28 rigidly secured to the inner side of the angle iron loop 20, and so disposed with relation to the ram, as to afford a bearing or guide therefore.

As illustrated in Figure 2 the eyelet 25 retains a chain 29 which is connected to a snow plow mechanism of a type capable of being suspended in an elevated position when not in use.

The snow plow, as illustrated, is detachably supported to the front axle by a clamp 30 and comprises generally a framework 31 articulate with the vehicle axle clamping mechanism 30 and supporting, at its forward end, a share 32.

The air cylinder 22 is provided with an inlet opening 33 disposed in the lower portion of the cylinder and connected through a pipe 34 to valve 35 mounted in a position accessible to the vehicle operator. From the valve 35 there is a pipe 36 which is connected to an air reservoir 37, the reservoir being connected to the air compressor 17 through a pipe 38.

In order to accommodate the attachment of the elevating mechanism to various types of vehicles or to different positions upon the same vehicle the supporting structure 19 is detachably supported upon brackets 39 secured to the vehicle frame. These brackets are preferably constructed with a vertically disposed apertured boss adapted to receive a pin 40 which supports the bifurcated ends of brackets 41 secured to the cross members 21 of the frame 19.

The cylinder supporting frame 20 is held in vertical alignment by stay rods 44, which are detachably pivoted to brackets 42, mounted on the frame 20, and also detachably secured to brackets 43, affixed to chassis frame 10.

When the vehicle is in operation and it is desired to elevate the share from the ground the valve 35 is adjusted to a position which will permit fluid communication between the reservoir 37 and the cylinder 21. This will cause the actuation of the piston 23 within the air cylinder 22 and effect the elevation of the snow plow or other body which is united to the end of the ram 24. Upon further actuation of the valve 35 the air pressure will be relieved and the air within the cylinder will be permitted to escape thus effectuating the return of the piston and the release of the suspended body.

It is obvious that this structure and the organization of actuating mechanism therefor may be associated with the rearward portion of the vehicle and may be readily adapted for use in elevating and loading bodies from a platform or utilized to suspend one end of another vehicle while towing the same.

Although this invention has been described in detail and certain specific language has been employed in pointing out the merits thereof it is to be understood that this disclosure is merely illustrative and should not be interpreted to limit the invention either in scope or spirit unless such limitations are indicated in the claims appended hereto.

What is claimed is:

1. In combination with a motor vehicle having a chassis frame, a fluid operated elevating mechanism, a supporting structure for said elevating mechanism embodying readily detachable trunnion connections with the said chassis frame, said supporting structure being disposed upon the forward portion of the chassis frame, said elevating mechanism comprising a cylinder, a piston and a ram, a guide bearing mounted on said supporting structure co-ordinated with said ram, a front vehicular axle, a snow plow detachably mounted upon the vehicular axle and pivotally associated therewith, operative connections between said elevating mechanism and said plow, a fluid braking system, fluid connections between said cylinder and said braking system and means for controlling the transmission of fluid from said braking system to said cylinder.

2. In combination with a motor vehicle having a chassis frame, a fluid operated elevating mechanism, a supporting structure for said elevating mechanism embodying readily detachable trunnion connections with the said chassis frame, said supporting structure being disposed upon the forward portion of the chassis frame, said elevating mechanism comprising a cylinder, a piston and a ram, a guide bearing for said ram mounted on said supporting structure, a front vehicular axle, a snow plow detachably mounted upon said axle and pivotally associated therewith, operative connections between said elevating mechanism and said plow, a source of supply of fluid under pressure connected to said cylinder and valve means for controlling the flow of fluid to said cylinder.

3. In combination with a vehicle having a chassis frame, a fluid operated elevating mechanism, a supporting structure for said elevating mechanism mounted on said chassis frame, said supporting structure being disposed upon the forward portion of said chassis frame, said elevating mechanism comprising a cylinder, a piston and a ram, a guide bearing for said ram mounted on said supporting structure, a snow plow detachably mounted on said vehicle and pivotally associated therewith, operative connections between said elevating mechanism and said plow, a source of supply of fluid under pressure connected to said cylinder and valve means for controlling the flow of fluid to said cylinder.

In testimony whereof I hereunto affix my signature this 28th day of December, 1927.

PERCY E. BARKER.